United States Patent [19]

Scheibe et al.

[11] 4,267,139
[45] May 12, 1981

[54] REINFORCED PLASTIC BELT LOOP

[75] Inventors: Joachim Scheibe, Laudenbach; Helmut Kuhn, Mörlenbach, both of Fed. Rep. of Germany

[73] Assignee: Firma Carl Freudenberg, Weinheim, Fed. Rep. of Germany

[21] Appl. No.: 83,276

[22] Filed: Oct. 10, 1979

[30] Foreign Application Priority Data

Oct. 14, 1978 [DE] Fed. Rep. of Germany ....... 2844907

[51] Int. Cl.$^3$ ............................................ B29D 29/00
[52] U.S. Cl. ................................... 264/229; 156/137; 264/230; 425/111
[58] Field of Search .................. 264/229, 230; 156/84, 156/86, 140, 141, 161, 165, 137; 425/111

[56] References Cited

U.S. PATENT DOCUMENTS

| 2,330,405 | 9/1943 | Case ................................ 156/165 X |
| 2,652,093 | 9/1953 | Burton ................................ 156/86 |
| 3,296,047 | 1/1967 | Parr ........................................ 156/86 |
| 3,466,210 | 9/1969 | Wareham ......................... 264/230 X |
| 3,666,584 | 5/1972 | Fix ......................................... 156/84 |

Primary Examiner—Thomas P. Pavelko
Attorney, Agent, or Firm—Kenyon & Kenyon

[57] ABSTRACT

A reinforced plastic belt loop is made by positioning endless shrinkable reinforcement strands circumferentially around a core and shrinking the strands on the core so that the strands become tensioned. Then a hardenable casting plastic is cast in a mold surrounding the core and strands and hardened so that it holds the strands permanently under tension. This forms the belt loop with pretensioned reinforcements.

8 Claims, 4 Drawing Figures

REINFORCED PLASTIC BELT LOOP

BACKGROUND OF THE INVENTION

A rotating reinforced plastic belt loop has been used in textile plants to form a tensioned span pressed against a rotating rigid metal counterroll to form a nip through which textile filaments are propelled at high velocity. The filaments are impressed or less into the belt surface, and this, with the high velocity, subjects the belt to high mechanical stresses. The filaments may be treated with a scrooping agent which can chemically affect the belt's surface.

To meet the above conditions, a polyurethane elastomer having a surface hardness of 60 to 95 Shore A when hardened, and composed of an NDI or TDI and polyester or polyether, is satisfactory as the plastic component.

To provide reinforcement for the plastic, it is old to use fiber gauze in the form of a flat length which is impregnated with a solution of the plastic, dried from the solution's solvent and then wrapped around a core, necessarily with overlapped ends. With the core and reinforcement in a mold, the plastic is cast and hardened to form the belt loop.

The above technique has the disadvantage that to avoid the overlapping causing excessive thickening and introducing dynamic unbalance when the belt loop is in high speed operation, extremely light fiber gauge must be used, such as having an area weight between 10 and 50 g/m$^2$. Liquid casting plastic impregnation is uncertain and the reinforcement strength provided is subject to question. The weight and strength of the reinforcement cannot be increased appreciably because this would increase the overlap with its attendant alteration in the overall flexibility of the belt and in the balance of the belt loop when operating. An undesirable number of manufacturing steps are used.

DESCRIPTION OF THE INVENTION

The present invention differs from that prior art in that instead of starting with a flat length of gauze, the endless circumferentially reinforced plastic belt loop is made by positioning endless shrinkable reinforcement strands circumferentially around the core and shrinking the strands onto the core so that the strands are under tension. Shrinkage can be by drying of wet strands when the latter are made of some materials, such as cotton, but preferably the strands are made from a heat shrinkable plastic. With the endless circumferential strands under tension, the hardenable casting plastic is cast in the mold surrounding the core and strands so as to impregnate the latter, the plastic then being hardened so that it holds the strands under their tension and forms a reinforced plastic belt loop on the core. The core can be coated with a separating material as usual, so that the loop can be lifted off and possibly transversely cut to provide the precise desired belt width.

The reinforcement strands can be positioned substantially parallel to each other and endlessly encircling the core, these strands being held in position by cross strands which are not correspondingly heat shrinkable and preferably not heat shrinkable at all. The diameter of the reinforcement strands can be preferably from 0.05 mm to 0.1 mm. These thicknesses are greater than could heretofore be used with the overlapping practice, and they provide a relatively open pore structure for easier impregnation by the polyurethane casting liquid.

With the reinforcement strands made of heat shrinkable plastic and the casting plastic heat hardenable, it is possible to apply the reinforcement strands to the core and to follow this immediately by casting of the liquid plastic, heating to cure or harden the plastic initially causing shrinkage of the reinforcement strands followed by the hardening of the cast plastic which normally requires more time than is required for the shrinkage.

The reinforcement strands can be spun from filaments having differing degrees of heat shrinkage so that after the shrinking operation the strands crinkle and provide a more open structure for easier impregnation by the casting plastic. The diameters of the strands which hold the circumferentially extending reinforcement strands preferably should be roughly comparable to the latter in thickness.

Preferably the reinforcement is formed into a hose of tubular shape with the shrinkable reinforcement strands extending circumferentially and held by the longitudinally extending strands used to hold the reinforcement strands in position. This hose can be slipped over the core and with the latter heated shrunk tightly onto the core with the circumferentially extending reinforcement strands tensioned to a degree depending on the shrinkability of the plastic used. This can be a quick operation followed by casting of the liquid plastic into the space formed by the mold surrounding the core and the reinforcement.

The circumferentially extending shrinkable reinforcement strands should be endless, and when in hose form, can be arranged so that they are substantially parallel to each other and positioned by the longitudinally or axially extending holding strands of stable physical form. Connections between the crisscrossing parts can be frictional as by weaving or otherwise. The cross strands can be adhesively secured together if desired providing the adhesive used cannot affect the shrinkability of the reinforcement strands or have a harmful effect on the reaction of the casting plastic.

Using as a casting plastic a liquid reaction mixture of polyurethane, viscosities of from 500 to 1000 cP insure good impregnation of the reinforcement when the strands have the size previously indicated.

By this invention an endless belt loop is obtained that is completely free from overlapping parts and which can, therefore, be operated with a good dynamic balance at high speeds, and the reinforcement strands which extend circumferentially and are in line with the tension on the belt when it is in operation, are prestressed with tension which is captured or held by the hardened casting plastic.

To exemplify the practice of this invention, a specific example is disclosed by the accompanying drawings and the following detailed description.

DESCRIPTION OF THE DRAWINGS

The drawings are somewhat schematic, the various views being as follows.

DETAILED DESCRIPTION OF THE DRAWINGS

Figure 1:
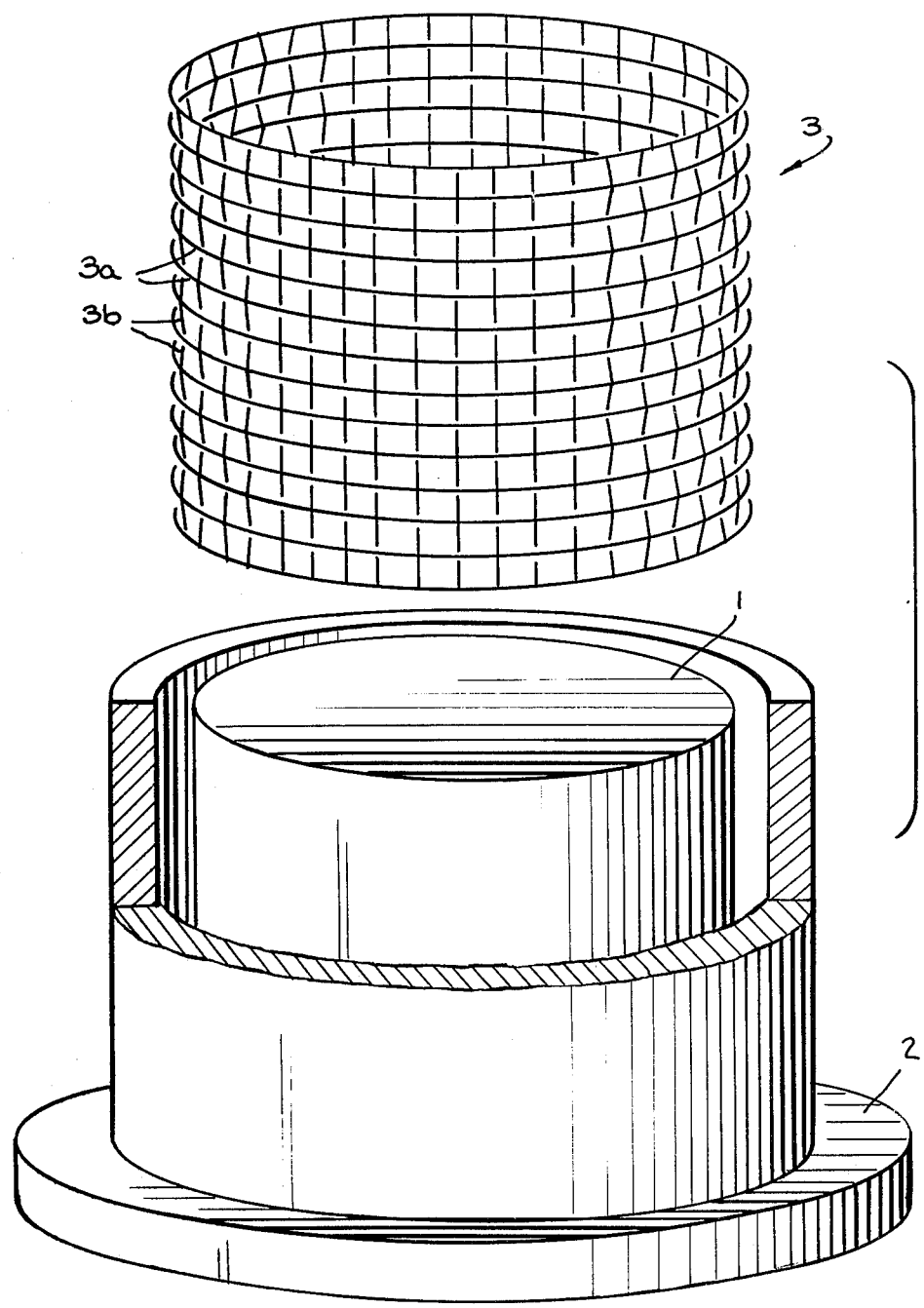
FIG. 1, partly in perspective and partly in vertical section, shows the core and mold with the reinforcement about to be placed on the core.

In FIG. 1, the previously mentioned cylindrical core 1 has a diameter of 100 mm and a height of 80 mm, its surrounding mold 2 having an equal height but an inside diameter of 102 mm. The interfacing surfaces of the core and mold are cylindrical and are smooth and highly polished. It is to be assumed that the core and mold are heated to a fixed temperature of 120° C., and that their interfacing surfaces would be coated with a suitable release agent prior to each molding operation.

The reinforcement insert 3, in the form of the hose, is also 80 mm long and has an inside diameter of 101 mm so that it can be easily and quickly slipped onto the core 1. This hose has the circumferentially strands 3a of endless filaments of polyester having a diameter of 0.102 mm and manufactured with a high degree of strain so as to be highly heat shrinkable. The vertically extending strands 3b running longitudinally with respect to the hose, are made of polyamide 66 and have a diameter of 0.077 mm. These vertically extending strands are not heat shrinkable and each is woven alternately over and under successive ones of the circumferentially extending heat shrinkable strands 3a so that the mutually crossing strands are fixed in their proper relationship by friction. It can be seen that the reinforcement 3 is essentially a hose of fabric having circumferentially extending heat shrinkable strands 3a extending substantially parallel to each other and positioned by the vertically extending non-heatshrinkable strands 3b.

In this hose construction the reinforcing heat shrinkable strands 3a which extend circumferentially can be interspaced about 0.6 mm, while the longitudinally or vertically extending strands 3b are interspaced about 0.4 mm.

Figure 2:
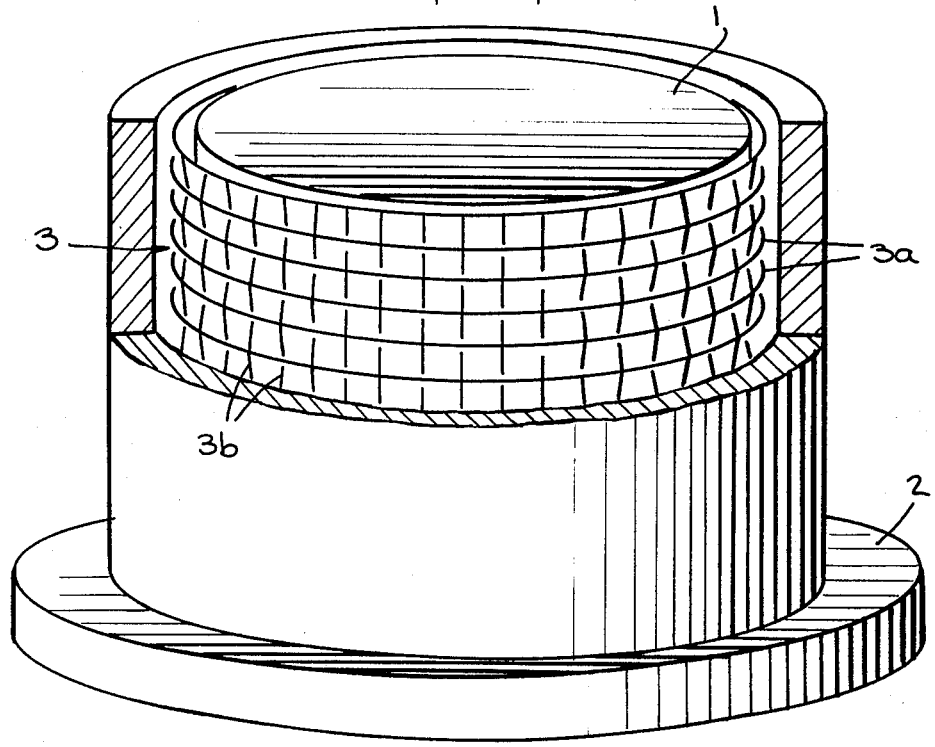
FIG. 2, also a perspective view and partly in vertical section, shows the reinforcement in position on the core and ready to receive the liquid plastic casting material.

In FIG. 2, the reinforcement 3 is shown after it has been slipped over the core 1. The reinforcement or hose has an easily sliding fit with the core, permitting the reinforcement to be quickly threaded downwardly into the casting space formed between the core and mold and thus insertd over the core. With the core heated, the reinforcement hose is heated by both radiation and conduction so its heat shrinkable strands 3a start to shrink so that with time the reinforcement hose embraces the core 1 tighter and tighter. Because the core 1 is made of rigid material, such as steel, it holds the inside diameter of the hose to the diameter of the core, this forcing the circumferentially extending reinforcement strands which shrink more and more with time, to become ever increasingly tensioned in the circumferential direction. Complete shrinkage requires about five minutes.

Although the reinforcement hose can be permitted to shrink to its completely shrunk condition before casting is begun, it is considered preferable to start the casting as soon as the reinforcement hose is properly positioned on the core 1. In any event, the next step is to cast a bubble-free liquid polyurethane reaction mixture into the cylindrical mold surrounding the core and reinforcement fabric. With adequately low viscosity, such as within the range previously referred to, the cast mixture impregnates the relatively open pore structure of the reinforcement uniformly, completely and without the formation of air bubbles or voids.

The polyurethane reaction time is in the order of fifteen minutes and with completion of reaction the plastic is in the form of a flexible elastomer capable of holding the tensioned reinforcement strands against any substantial release of their tension, this holding action being permanent and resulting in the circumferentially extending reinforcement strands being pretensioned or prestressed so as to thereafter resist stretching of the resulting product more effectively than would be the case in the absence of the pretensioning or prestressing.

Figure 3:
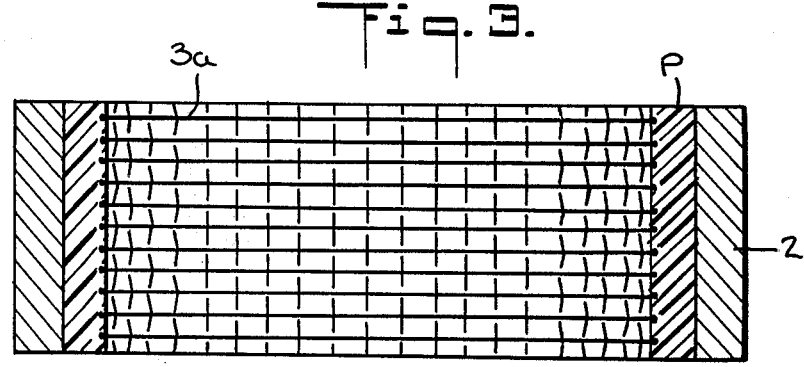
FIG. 3 is a short vertical section with the top and bottom parts eliminated, showing the manner in which the liquid plastic casting material has impregnated the reinforcement and is hardening or has hardened.
Figure 4:
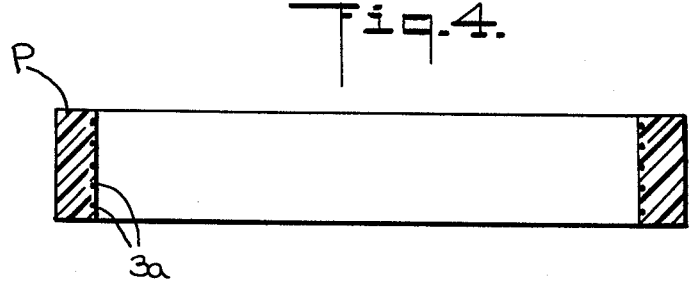
FIG. 4 in vertical section shows the belt loop product.

In FIG. 3, although the mold 2 is shown, the core 1 is not shown so as to better expose the cast product which now consists of the prestressed circumferentially extending strands 3a permanently held under tension by the cast and hardened plastic P produced from the cast material. This cast product is longer than ordinarily required but can be cut to the desired belt width. A typical belt width is 30 mm and it is to such lengths that the 80 mm long cast product can be cut, producing finished products as shown by FIG. 4, excepting possibly for certain minor finishing steps such as subjecting the inside surface of the belt to a surface roughening treatment.

The polyurethane mixture used for casting should produce a cured elastomer having a surface hardness of from 60 to 95 Shore A. The liquid casting mixture can be an NDI or TDI and polyester or polyether producing, when cured, a surface hardness of preferably 70 Shore A.

What is claimed is:

1. A method for making an endless circumferentially reinforced plastic belt loop, comprising positioning endless shrinkable reinforcement strands circumferentially around a core and shrinking the strands onto the core so that the strands are under tension, casting a hardenable casting plastic in a mold surrounding the core and strands, and hardening the plastic so that it holds the strands under said tension and forms said loop when removed from the core and mold.

2. The method of claim 1 in which said reinforcement strands are shrunk prior to said casting.

3. The method of claim 1 in which said reinforcement strands have non-uniform shrink characteristics so that upon shrinking the strands crinkle.

4. The method of claim 1 in which said reinforcement strands are made of heat shrinkable plastic and shrunk by heating and are positioned substantially parallel to each other by cross strands which are not correspondingly heat shrinkable, and said casting plastic is a liquid reaction mixture of polyurethane which is hardened by heating.

5. The method of claim 4 in which said heat shrinkable plastic is selected from the class consisting of polyacryl-nitril, modacryl and polyester fibers initially containing stored shrink energy.

6. The method of claim 5 in which the diameter of said reinforcement strands is from 0.05 to 0.1 mm.

7. The method of claim 6 in which said mixture, when hardened, has a surface hardness of from 60 to 95 Shore A.

8. The method of claim 7 in which said casting is done before completion of said shrinking and said heating both shrinks said reinforcement strands and hardens said casting plastic.

* * * * *